United States Patent [19]

Jacobsen

[11] Patent Number: 5,020,178

[45] Date of Patent: Jun. 4, 1991

[54] STABILIZING PRESSURE AND FLOW CONDITIONS IN A SCREENING APPARATUS

[75] Inventor: Finn Jacobsen, Karlstad, Sweden

[73] Assignee: Kamyr AB, Karlstad, Sweden

[21] Appl. No.: 423,245

[22] Filed: Oct. 18, 1989

[30] Foreign Application Priority Data

Nov. 11, 1988 [SE] Sweden ............................ 8804082

[51] Int. Cl.$^5$ .............................................. D21D 5/04
[52] U.S. Cl. ...................................... 8/156; 68/181 R;
162/60; 210/393; 210/791
[58] Field of Search ................ 8/156; 68/18 F, 181 R;
162/60, 251, 380; 210/791, 798, 388, 389, 393, 411

[56] References Cited

U.S. PATENT DOCUMENTS

| | | | |
|---|---|---|---|
| 4,029,579 | 6/1977 | Jacobsen et al. | 68/181 R X |
| 4,368,628 | 1/1983 | Jacobsen | 68/181 R |
| 4,396,509 | 8/1983 | Foyn | 210/315 |
| 4,793,161 | 12/1988 | Richter et al. | 68/181 R |
| 4,840,047 | 6/1989 | Richter et al. | 68/181 R |
| 4,908,896 | 3/1990 | Jacobsen et al. | 68/181 R X |

*Primary Examiner*—Philip R. Coe

*Attorney, Agent, or Firm*—Nixon & Vanderhye

[57] ABSTRACT

A method of stabilizing pressure and flow conditions in a screening apparatus for treating a pulp is described, the pulp being supplied continuously to the screening apparatus through an inlet and passed through a pulp space along a screen of a screen body and discharged continuously through an outlet, said screen body being moved axially with a forward-going movement during an extraction phase and a backward-going movement during a backflushing phase. The flowrate of the pulp through, and the pressure conditions in, the treating zone of the screening apparatus are controlled by altering the volume at the inlet end and outlet end of the screening apparatus during the movement of the screen body. A screening apparatus for carrying out the method is also described, which comprises a cylinder housing with a piston movable to and fro therein by means of a drive device, said piston defining a first chamber filled with liquid and a second chamber filled with pulp, said pulp chamber being in direct communication with the pulp inlet. Furthermore, a connection channel filled substantially with liquid is disposed between the liquid chamber and an outlet zone of the pulp space located at the outlet for treated pulp.

11 Claims, 3 Drawing Sheets

STABILIZING PRESSURE AND FLOW CONDITIONS IN A SCREENING APPARATUS

FIELD AND BACKGROUND OF THE INVENTION

The present invention relates to a method of stabilizing pressure and flow conditions in a screening apparatus for treating a pulp of fibrous cellulosic material. The invention also relates to a screening apparatus for performing this method.

U.S. Pat. No. 4,396,509 describes a screening apparatus of pressure diffuser type with a screen moving in a cycle to and fro and being journalled on two cylindrical support bodies having different diameters at the inlet and outlet sides of the displacement zone. At the return movement of each cycle the screen executes a rapid return stroke, the volume of the filtrate or extraction space being reduced as a result of said differences in the diameters of the support bodies. The screen is thus backflushed with a liquid volume corresponding to the difference in cross-sectional areas of the two cylindrical support bodies multiplied by the stroke length of the screen minus the quantity of displaced liquid removed from the screening apparatus during the return stroke. During the rest of the cycle, i.e. the extraction phase, the screen moves in the same direction, and at substantially the same speed, as the pulp. In this known method the pulp is moved at the correct speed in relation to the screen at the same time as clogging of the screen holes is prevented. However, the distribution of backflushing is not satisfactory. One solution to this problem is to design the screen as a truncated cone, as described in U.S. Pat. No. 4,368,628.

In the known screening apparatus described in the above-mentioned patents, the pulp flows continuously into and out of the displacement zone at the same time as displacement liquid is supplied radially from the outside in the direction to the screen surface and extracted or displaced liquid is allowed continuously to leave the apparatus. As a result of the in and out flow of the pulp the pressure in the pulp will increase at the inlet end of the screen or displacement zone and drop at its outlet end during the return stroke of the screen.

A pressure gradient thus exists between the inlet end and outlet end of the displacement zone. This circumstance may prevent the backflushing from being correctly distributed since no corresponding pressure gradient occurs in the space for the displaced liquid. Most of the backflushing will therefore occur close to the outlet end of the displacement zone, whereas little or no backflushing will occur in the direction to the inlet end of the screen.

SUMMARY OF THE INVENTION

The object of the present invention is to provide stabilization of the pressure and flow conditions in the screening apparatus, to ensure uniform distribution of liquid during the return stroke when backflushing the screen.

The present invention relates to a method of stabilizing pressure and flow conditions in a screening apparatus for treating a pulp of fibrous cellulosic material, comprising the steps of supplying pulp continuously to the screening apparatus through an inlet, passing the pulp through a pulp space along a screen of a screen body, discharging the pulp continuously through an outlet, extracting liquid and possibly supplying displacement liquid, said screen body being moved axially with a forward motion during an extraction phase and a backward motion during a backflushing phase, and controlling the flowrate of the pulp through, and the pressure conditions in, the treating zone of the screening apparatus by altering the volume at the inlet end and outlet end of the screening apparatus during the movement of the screen body.

In the preferred embodiment of the method according to the invention the space for untreated pulp at the inlet end of the screening apparatus is increased during said backflushing phase so that pulp is substantially prevented from flowing along the screen, and substantially simultaneously the space for pulp being treated in the screening apparatus is decreased in a substantially corresponding degree by introducing an equivalent quantity of liquid and/or pulp into an outlet zone for treated pulp so that pulp treated in the apparatus is caused to flow in the direction to and through the outlet. Furthermore, the space for untreated pulp at the inlet end of the screening apparatus is then decreased during said extraction phase so that pulp flows along the screen, and substantially simultaneously the space for pulp being treated in the screening apparatus is increased in a substantially corresponding degree by removing an equivalent quantity of pulp from the outlet zone by some path other than through the outlet of the screening apparatus.

The invention also relates to a screening apparatus for performing said method for stabilizing pressure and flow conditions therein when extracting liquid from a pulp of fibrous cellulosic material and possibly supplying displacement liquid, comprising a vessel and an elongate screen body disposed therein and provided with a screen disposed to be displaced axially to and fro in the vessel by means of a drive device, said vessel having a pulp space with an inlet for pulp to be treated and an outlet for treated pulp which has passed along the screen, said screen body defining a space to receive liquid extracted through the screen, which is removed from the vessel through an outlet, the screening apparatus further comprising a cylinder housing with a piston movable to and fro therein by means of a drive device, said piston defining a first chamber filled with liquid and a second chamber filled with pulp, said pulp chamber being in direct communication with the pulp inlet, and a connection channel filled substantially with liquid and being disposed between the liquid chamber and an outlet zone of the pulp space located at the outlet for treated pulp.

BRIEF DESCRIPTION OF THE DRAWINGS

By way of example, the invention will be described further with reference to the drawings in which.

DESCRIPTION OF ILLUSTRATED EMBODIMENT

Figure 1:
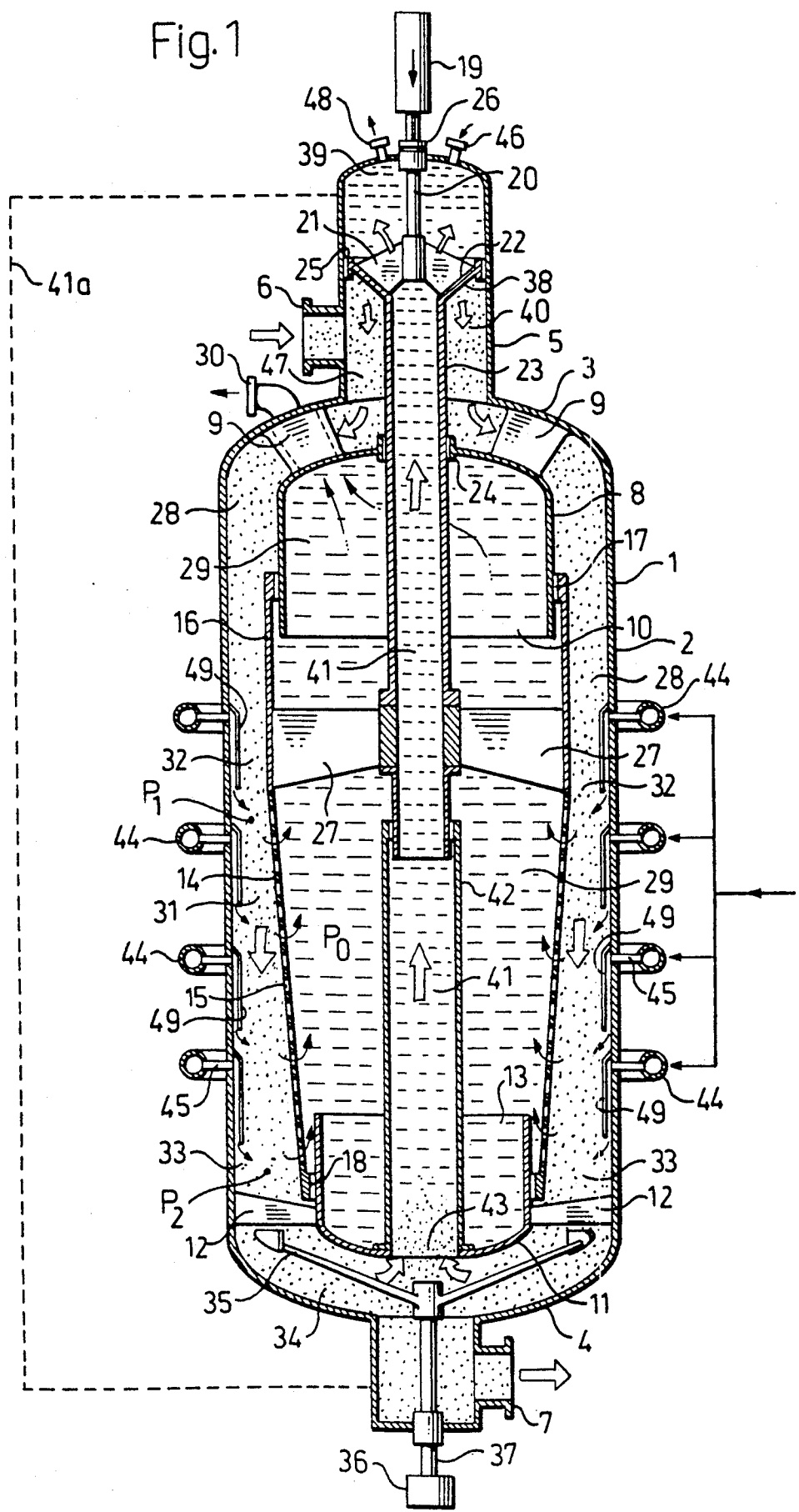
FIG. 1 shows schematically a cross section through a screening apparatus according to the invention during a first part of a cycle during operation.
Figure 2:
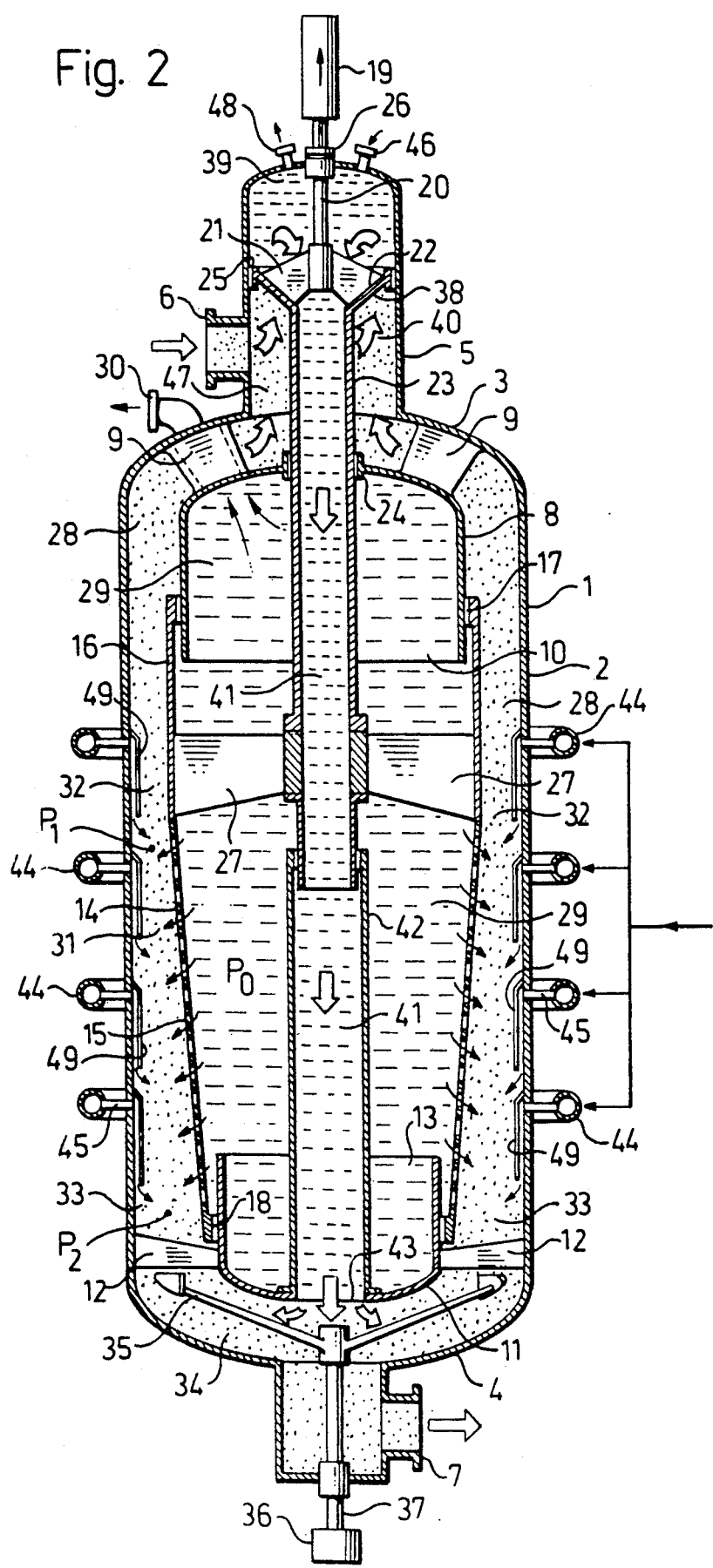
FIG. 2 shows the screening apparatus according to FIG. 1 during a second part of the cycle during operation.

FIGS. 1 and 2 show schematically a screening apparatus of pressure diffuser type which is constructed in accordance with the present invention for the treatment of pulp of medium consistency, i.e. about 8–15%, preferably about 10%. The screening apparatus comprises a closed, vertically disposed vessel 1 with a cylindrical external side wall 2 and upper and lower domed external end walls 3, 4. At its upper end wall 3 the vessel 1 is provided with a vertically disposed cylinder housing 5, closed at the top, which can be considered as constituting a narrower extension of the vessel 1 and thus has a smaller diameter than the latter. The screening apparatus is provided at the top, with an inlet 6 at its inlet end for the pulp, i.e. suspension of cellulosic fiber, to be treated, and at the bottom at its outlet end, with an outlet 7 for the treated pulp. The outlet 7 is disposed in the lower end wall 4 of the vessel. In the embodiment shown, the pulp inlet 6 is disposed in the lower portion of the cylinder housing 5.

A generally bowl-shaped upper support body 8 is disposed inside the upper portion of the vessel 1. The support body 8 is secured, for instance, by rib-shaped spacers 9 to and spaced from the end wall 3 of the vessel. The inverted bowl-shaped support body 8 has a vertical, cylindrical portion 10 with predetermined diameter. A similar, generally bowl-shaped lower support body 11 is disposed inside the lower portion of the vessel 1, said support body 11 being secured by spacers 12 to and spaced from the end wall 4 of the vessel. The right standing bowl-shaped support body 11 has a cylindrical portion 13 of predetermined diameter, this diameter being slightly less than that of the cylindrical portion 10 of the upper support body 8.

Further, an elongate screen body 14 with circumferential outer surface is axially movably disposed in the vessel 1 and comprises a screen 15 in the form of a truncated cone, tapering in the direction downwards. In the embodiment shown the screen body 14 also comprises a cylindrical, tight portion 16 located above and secured to the screen 15. The upper end of said portion 16 is provided on the inside with an annular seal 17, sliding and sealing against the cylindrical portion 10 of the stationary upper support body 8. A similar annular seal 18 is disposed on the inside, at the lower end of the screen 15, sliding and sealing against the cylindrical portion 13 of the stationary lower support body 11. The screen 15 consists of shape permanent sheet-metal with suitable screen openings.

The screen body 14 is axially movable up and down by means of a drive device 19 disposed above the vessel 1. The drive device may be a hydraulic or pneumatic power cylinder with an axial rod 20 extending a distance into the cylinder housing 5. The rod 20 is secured in the housing by attachment pieces 21 at a radially enlarged or funnel-shaped orifice portion 22 of an axial pipe 23. The pipe 23 extends down through the housing 5 and vessel 1, through a central opening in the upper support body 8, said opening having an annular seal 24 to slide and seal against the pipe 23. The enlarged orifice portion 22 of the pipe 23 bears an annular, external seal 25 to slide and seal against the inside of the housing 5. Further, a seal 26 is disposed at the place where the rod 20 enters into the housing 5. The pipe 23, axially movable by the drive device 19, is rigidly joined to the screen body 14 by attachment pieces 27 secured to the unperforated cylindrical portion 16 of the screen body 14. During operating the screen 15 moves continuously up and down apart from the very brief periods of time elapsing at the end positions of the movement cycle. The screen is thus arranged to be moved in a slow forward motion during an extraction phase, and immediately thereafter in a rapid backward motion during a backflushing phase.

A space 28 for pulp is defined between the walls 2, 3, 4 of the vessel and the stationary support bodies 8 and 11 axially spaced from each other, and the screen body 14 extending therebetween, said space extending in direct communication from the pulp inlet 6 to the pulp outlet 7. Internally the screen body 14 and the two support bodies 8, 11 define a space 29 to receive the liquid passing through the screen openings in the screen 15. This liquid is removed from the space 29 through an outlet 30 extending through the upper support body 8 and the upper end wall 3 of the vessel 1.

A treating or displacement zone 31, the inlet end of which is designated 32 and outlet end of which is designated 33, is formed within the axial extension of the screen 15 in the pulp space 28. Close to the pulp outlet 7, inside the vessel 1, is an outlet zone 34 which thus forms a portion of the pulp space 28. A scraper 35 is disposed in the outlet zone 34, which rotates the pulp to mix it and facilitate feeding out through the outlet 7. The scraper 35 is driven by a drive device 36 via a vertical shaft 37.

The orifice portion 22 of the pipe 23 described above, with its annular seal 25, forms a piston 38 which is movable up and down by the drive device 19 in the cylinder housing 5 and which defines an upper first chamber 39 for liquid and a lower second chamber 40 for pulp. The pulp chamber 40 is so located that it communicates directly with the pulp space 28 in the vessel 1.

The liquid chamber 39, located above the enlarged orifice portion 22, communicates with the pulp space 28 of the vessel 1 at its outlet zone 34 via a central, open connection channel 41 which includes said pipe 23 which as such forms a rigid unit with the screen body 14. In the embodiment shown the central connection channel 41 is telescopic. Besides the axially movable pipe 23, it then includes a stationary pipe 42 secured by its lower end to the lower support body 11 at a central opening 43 therein, and with its upper end portion telescopically and sealingly encloses the lower end portion of the movable pipe 23. Alternatively the movable pipe 23 may be elongated a considerable length downwardly and the stationary pipe 42 correspondingly shortened, or the movable pipe 23 may be extended downwardly and passed through the opening 43 in the lower support body 11, sealingly cooperating therewith. In this case the lower portion of such an elongated pipe is located in said outlet zone 34 of the pulp space 28, and the scraper 35 must then be moved a short way down or designed differently so that the elongated pipe runs free from the scraper.

A plurality of distribution pipes 44 are disposed outside the vessel, extending around the side wall 2, for the supply of a suitable displacement liquid to the pulp via inlets 45. The displacement liquid displaces a corresponding quantity of the liquid phase in the pulp through the screen 15 to the inner space 29, from which the displaced liquid is removed via the outlet 30. A plurality of shields 49 are suitably disposed around the inside of the vessel to distribute the displacement liquid supplied. The shields 49 extend downwardly from the inlets 45 in order to define circumferential inlet slots. The shields are suitably cylindrical as shown in FIGS. 1 and 2.

The liquid chamber 39 and the central connection channel 41 are initially filled with a suitable fluid material, e.g. water or some other suitable liquid. During operation a small quantity of supplementary liquid is supplied continuously to the liquid chamber 39 of the cylinder housing through a special inlet 46 at the upper end of the cylinder housing 5. Further, a special outlet 48 is disposed at the upper end of the cylinder housing 5 for deaerating the liquid chamber 39 and the central connection channel 41 during the initial filling. A small quantity of liquid is also continuously removed through this outlet 48 during operation in order to prevent any air from collecting in the liquid chamber 39. The amount of liquid thus withdrawn is then kept less than the amount of supplementary liquid supplied through the inlet 46. Full hydraulic communication thus prevails during operation between the liquid in the liquid chamber 39 in the cylinder housing 5 and the pulp space 28 of the screening apparatus at the outlet zone 34.

Figure 3:
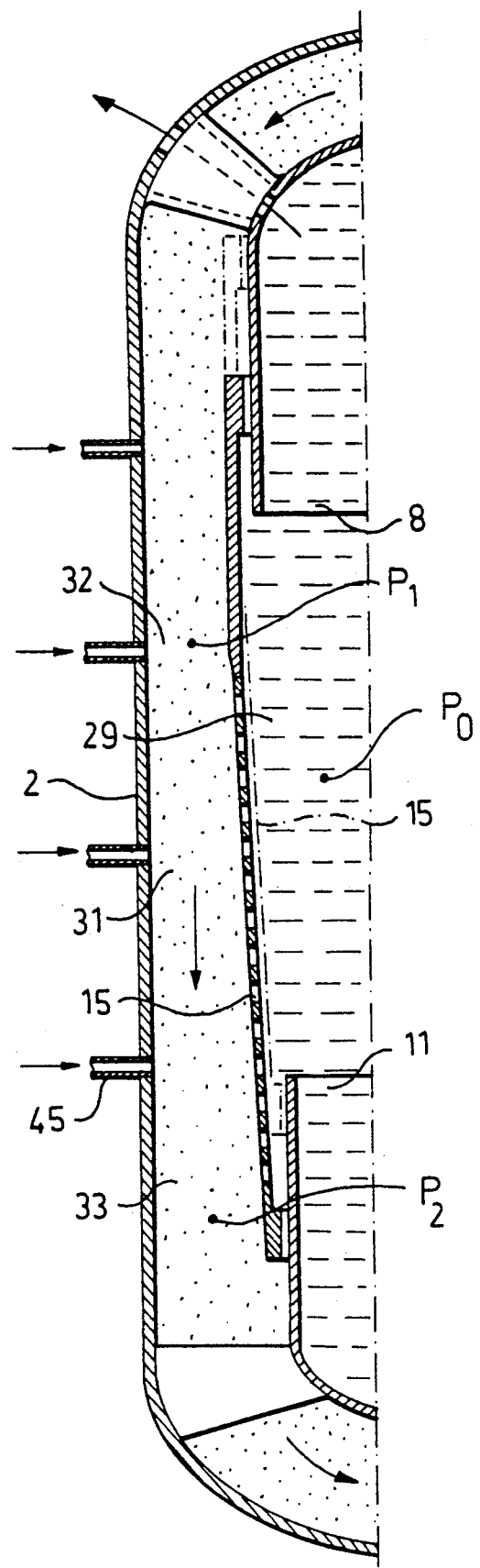
FIG. 3 shows a portion of a screening apparatus according to a known embodiment which lacks the improvements proposed by the present invention.

FIG. 3 shows portions of a known screening apparatus of the same basic construction as the apparatus according to the invention. The same reference numbers are therefore used to denote equivalent parts and elements. In the known apparatus, the pulp flows continuously in and out of the displacement zone 31 while displacement liquid is simultaneously supplied from outside radially in the direction to the screen surface. During the return movement of the screen, i.e. during the backflushing phase of the screen cycle, consequently, the pressure at the inlet end 32 of the screen or displacement zone 31 will rise to a value $P_1$ and drop at its outlet end 33 to a value $P_2$. A pressure gradient consequently exists between the inlet end 32 and outlet end 33 of the displacement zone. This situation will disturb correct distribution of the backflushing through the screen openings since the dynamic pressure $P_O$ in the space 29 for the extracted or displaced liquid is the same on the two levels. At the return stroke of the screen, therefore, the following pressure relation exists: $P_1 > P_O > P_2$. The equation confirms that the backflushing of the screen openings during the return stroke of the screen is not uniformly distributed along the screen 15 and that most of the backflushing will occur close to the outlet end 33 of the displacement zone 31 whereas little or no backflushing will occur in the direction to the inlet end 32 of the screen 15.

The apparatus according to the invention eliminates said undesired pressure gradient in the pulp between the inlet and outlet ends 32, 33 of the displacement zone 31. The enlarged orifice portion 22 of the pipe 23 shown in FIGS. 1 and 2, and its associated seal 25, as mentioned form a piston 38 which is moved down and up by the power cylinder 19. The net area of the annular piston 38 is dimensioned so that the stroke volume of the piston 38 approximately corresponds to the volume of pulp entering through the inlet 6 during the return movement, with the addition of a volume of pulp possibly displaced by the screen body 14 during its return movement. An equal volume of liquid will thereby be displaced from the liquid chamber 39 in the cylinder housing 5. This liquid displacement will be transmitted through the central connection channel 41 that is open all the time so that a corresponding displaced volume of liquid and possibly pulp previously displaced from below, will be forced out of the connection channel 41 into the outlet zone 34 of the pulp space 28. No pulp will thereby flow through the displacement zone 31 during the return stroke of the screen body 14. The inconvenient pressure gradient $P_1$-$P_2$ in the pulp is thus eliminated during the return stroke of the screen body.

FIG. 2 shows the screening apparatus according to the invention during operation when the screen 15 is subjected to backflushing with displaced or extracted liquid from the space 29 in that the screen body 14 is rapidly moved upwardly by means of the power cylinder 19, arrows indicating the momentary flows of liquid through the screen openings. The volume of pulp simultaneously supplied through the pulp inlet 6, plus a possible volume of pulp displaced by the screen body 14 itself at the upper end portion, is "stored" in the pulp chamber 40 of the cylinder housing 5, below the piston 38. An equivalent volume of pulp is simultaneously fed through the opening 43 to the outlet zone 34 in that the piston 38 displaces the transmitting liquid in the liquid chamber 39 and the central connection channel 41 which in turn causes an equal or substantially equal volume of treated pulp to flow out through the pulp outlet 7 and a small portion of pulp fills any "void space" which may arise under the lower end portion of the screen body 14 when this moves upwardly. The dynamic pressure difference between $P_1$ and $P_2$ will therefore be zero and this can be achieved at varying production rates by controlling the speed of the screen body 14 during its return movement, which in turn directly actuates the momentary flow of liquid through the central connection channel 41 and thereby the pressure in the inlet zone 47 (pulp chamber 40) and outlet zone 34. The embodiment described thus provides an almost optimum distribution of the backflushing and formation of a uniform film of liquid over the entire screen surface during this important phase of the cycle.

FIG. 1 shows the apparatus according to the invention during operation when liquid is displaced through the screen 15, as indicated by arrows, while the screen body 14 is moved slowly downwardly by the power cylinder 19 at the same speed as the pulp flows through the displacement zone 31. The speed of the screen body 14 is adjusted to the volume of pulp entering, plus the previously "stored" volume of pulp which is now displaced from the pulp chamber 40 by moving the piston 38 downwardly. At the same time as a volume of pulp corresponding to the volume fed in, is discharged through the pulp outlet 7, a smaller volume of pulp will be passed up and "stored" in the lower portion of the stationary central pipe 42. The volume of pulp "stored" in this way at the bottom of the central connection channel 41 is equal to the volume of liquid pressed out from the liquid chamber of the cylinder housing 5 during the preceding backflushing phase of the cycle. The speed of the screen body 14 is automatically regulated with the aid of the pressure difference $P_1$ minus $P_2$ which shall be maintained at a value of zero. By avoiding dynamic pressure differences between the inlet and outlet ends of the displacement zone 31 undesired vertical flows in this zone is prevented, and even ensures uniform transverse displacement of liquid all along the screen 15.

From FIGS. 1 and 2 it can be seen that the liquid in connection channel 41 will flow forwards and backwards, the flow direction being opposite to the direction of movement of the screen 15. As mentioned, only a small quantity of replacement liquid may have to be supplied through the inlet 46 at the top of the cylinder housing. The liquid in the central connection channel 41 functions in principle as a transmitting medium.

In the screening apparatus according to the invention both the pressure conditions and the flow in the pulp space 28 are stabilized throughout the cycle. The flow and pressure stabilizing system described improves the effect of the return and cleaning strokes of the screen 15, as well as essentially improving the synchronization of the movement of the pulp and the simultaneous concurrent movement of the screen 15, in that the speed of the screen 15 is now all the time adjusted to the real flow of pulp through the displacement zone 31. This is achieved by pulp only being allowed to pass through the displacement zone 31 during that part of the movement cycle as the screen 15 moves in the same direction as the pulp. A further advantage of the invention is that the flow and pressure conditions in the pulp pipes leading to and from the screening apparatus are also stabilized.

The screening apparatus according to the invention can also be mounted for such cases when the pulp flows in a direction other than downwards as shown in the drawings.

The treating agents normally used in the paper industry for various purposes, e.g. water, filtrate, bleaching agent, etc. can be used as displacement liquids. The screening apparatus can of course be used without the supply of displacement liquid, i.e. to extract liquid from the pulp to thicken it.

The pulp passing through the screening apparatus may be at atmospheric pressure or at pressures over, and even considerably over, 1 atmosphere.

The dashed line in FIG. 1 refers to an alternative embodiment of the invention in which the connection channel 41a extends outside the vessel 1 instead of centrally inside the vessel. The connection channel 41a is formed by a unitary pipe connected at one end to the liquid space 39 of the cylinder housing 5 and at the other end to the outlet zone 34 at the outlet 7 for treated pulp. In this case, the stationary pipe 42 is not utilized and the opening 43 in the lower support body 11 is omitted. Further, the movable pipe 23 is closed at the ends, or replaced by a solid rod.

In the embodiment shown in FIGS. 1 and 2 the truncated cone is disposed so that its smallest diameter is located nearest the pulp outlet 7 of the vessel. In an alternative embodiment the largest diameter is located nearest the pulp outlet of the vessel and in this case the pulp flows through the inner space of the screen and extracted liquid is received in the space between the screen and the side wall of the vessel.

Instead of being shaped as a truncated cone, the screen may consist, for instance, of two flat screen plates, inclined in relation to each other, with either the smallest or the largest distance between the screen plates located nearest the pulp outlet.

Instead of a common drive device 19, the pipe 23 and piston 38 may have separate drive devices, the piston thus being separate from the pipe. The drive device for the piston can then be started a predetermined short time before starting the drive device for the pipe.

The control of the flow speed of the pulp through the treating zone of the screening apparatus, as well as the pressure conditions therein, can also be accomplished by an arrangement located in or connected to the inlet conduit to the screening apparatus and having the same function as the cylinder housing 5 with its piston 38 and various chambers 39, 40. The expression "inlet end of the screening apparatus" thus has wider meaning, i.e. the inlet end may be considered to extend from or be located at said arrangement according to the last-mentioned embodiment.

That which is claimed is:

1. A method of stabilizing pressure and flow conditions in a screening apparatus during the treatment of fibrous cellulosic material pulp, utilizing a vessel having an inlet for pulp, and an outlet for pulp, a screen mounted in the vessel between the inlet and outlet for reciprocating movement along an axis in either a forward direction from the inlet toward the outlet, or a backward direction from the outlet toward the inlet, a space being formed for pulp movement between the interior of the vessel and the screen, and a liquid outlet for liquid extracted from the pulp by passing from the space through the screen, a pulp chamber defined by a piston adjacent the pulp inlet, and a liquid chamber defined by the piston, said method comprising the steps of:

(a) feeding pulp into the pulp inlet so that it flows in the space between the vessel and screen, and withdrawing treated pulp from the pulp outlet;

(b) withdrawing extracted liquid from the liquid outlet;

(c) reciprocating the screen along its axis by moving it relatively slowly in the forward direction and then relatively quickly in the backward direction so that backflushing of extracted liquid through the screen takes place during movement of the screen in the backward direction; and wherein during backflushing the pulp supplied to the pulp inlet is received in the pulp chamber defined by the piston, the volume of the pulp chamber increasing in a corresponding degree as the pulp is fed in by displacement of the piston in the backward direction, and a substantially equivalent volume of treated pulp is fed out substantially simultaneously through the pulp outlet by liquid being displaced from the liquid chamber, the volume of the liquid chamber decreasing in a corresponding degree as the volume of the pulp chamber increases, and through a connection channel filled substantially with liquid, emerging adjacent the pulp outlet in the pulp space, whereby pulp is substantially prevented from flowing along the screen during backflushing, and wherein during extraction pulp is displaced from the pulp chamber by the piston being moved in the forward direction at the same time as liquid is received in the liquid chamber and pulp is fed into the connection channel from adjacent the pulp outlet by increasing the volume of the liquid chamber in a corresponding degree as the volume of the pulp chamber decreases.

2. A method as recited in claim 1 wherein a small quantity of supplementary liquid is supplied continuously to the liquid chamber and a small quantity of liquid is continuously withdrawn from the liquid chamber through an outlet to prevent air from collecting in the liquid chamber and pulp from collecting in the upper portion of the connection channel, the quantity of liquid withdrawn being maintained less than the supplementary liquid added.

3. A method of stabilizing pressure and flow conditions in a screening apparatus during the treatment of fibrous cellulosic material pulp, utilizing a vessel having an inlet for pulp, and an outlet for pulp, a screen mounted in the vessel between the inlet and outlet for reciprocating movement along an axis in either a forward direction from the inlet toward the outlet, or a backward direction from the outlet toward the inlet, a space being formed for pulp movement between the interior of the vessel and the screen, and a liquid outlet for liquid extracted from the pulp by passing from the space through the screen, said method comprising the steps of:

(a) feeding pulp into the pulp inlet so that it flows in the space between the vessel and screen, and withdrawing treated pulp from the pulp outlet;

(b) withdrawing extracted liquid from the liquid outlet;

(c) reciprocating the screen along its axis by moving it relatively slowly in the forward direction and then relatively quickly in the backward direction so that backflushing of extracted liquid through the screen takes place during movement of the screen in the backward direction; and (d) improving the distribution of backflush liquid adjacent both the pulp inlet and pulp outlet of the vessel by simultaneously controlling the pressure at the pulp inlet and pulp outlet of the vessel during movement of the screen in the backward direction.

4. A method as recited in claim 3 wherein the pulp is of medium consistency.

5. A method as recited in claim 3 comprising the further step of supplying displacement liquid to the pulp flowing in the pulp space along the screen.

6. A method as recited in claim 5 wherein the screening apparatus has a pulp chamber defined by a piston adjacent the pulp inlet, and a liquid chamber defined by the piston; and wherein during the backflushing the pulp supplied to the pulp inlet is received in the pulp chamber defined by the piston, the volume of the pulp chamber increasing in a corresponding degree as the pulp is fed in by displacement of the piston in the backward direction, and a substantially equivalent volume of treated pulp is fed out substantially simultaneously through the pulp outlet by liquid being displaced from the liquid chamber, the volume of the liquid chamber decreasing in a corresponding degree as the volume of the pulp chamber increases, and through a connection channel filled substantially with liquid, emerging adjacent the pulp outlet in the pulp space, whereby pulp is substantially prevented from flowing along the screen during backflushing, and wherein during extraction pulp is displaced from the pulp chamber by the piston being moved in the forward direction at the same time as liquid is received in the liquid chamber and pulp is fed into the connection channel from adjacent the pulp outlet by increasing the volume of the liquid chamber in a corresponding degree as the volume of the pulp chamber decreases.

7. A method as recited in claim 3 wherein the screening apparatus includes a piston having a first face which faces the pulp inlet and is always in contact with untreated pulp adjacent the pulp inlet, and a second face which faces—via liquid which acts as transmission liquid—the pulp outlet and is always in contact with transmission liquid; and wherein step (d) is practiced by axially moving the piston simultaneously with the screen so that during movement in the backward direction transmission liquid automatically passes, under the influence of the piston, from adjacent but separated from the pulp inlet to adjacent the pulp outlet.

8. A method as recited in claim 7 wherein the screen is a cylindrical perforated body having a taper from the pulp inlet toward the pulp outlet so that the space increases in size from the inlet to the outlet, and wherein step (c) is practiced by moving the screen in the forward direction at approximately the speed of movement of the pulp through the space from the inlet to the outlet.

9. A method as recited in claim 7 comprising the further step of supplying displacement liquid to the pulp flowing in the pulp space along the screen body.

10. A method as recited in claim 7 comprising the further step of continuously deaerating the transmission liquid.

11. A method as recited in claim 7 comprising the further step of continuously supplying transmission liquid to a volume in contact with the piston second face, and continuously withdrawing from that volume less transmission liquid than is supplied.

* * * * *